April 29, 1952 V. P. BIVENS 2,594,852
TACKLE RETRIEVER
Filed Dec. 3, 1949
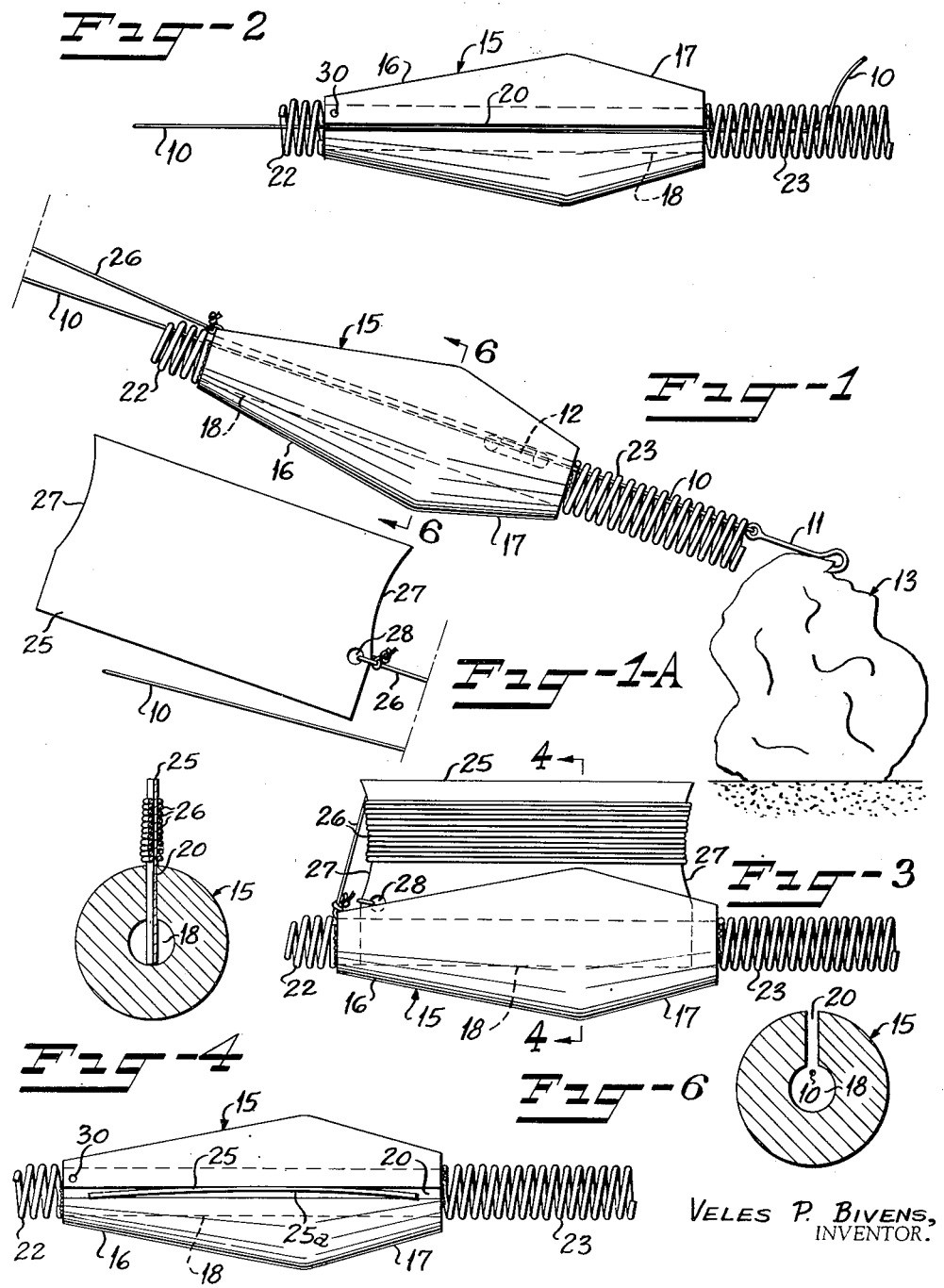
VELES P. BIVENS,
INVENTOR.
BY
ATTORNEY Patented Apr. 29, 1952

2,594,852

UNITED STATES PATENT OFFICE 2,594,852

TACKLE RETRIEVER

Veles P. Bivens, Lawndale, N. C.

Application December 3, 1949, Serial No. 130,937

1 Claim. (Cl. 43—17.2)

This invention relates to a tackle retriever for use by fishermen for retrieving tackle which has become embedded in or attached to an obstruction in or on the bottom of the water in which the tackle is being used.

It is an object of this invention to provide a tackle retriever comprising a body having a longitudinally extending bore therein and having spring members on opposed ends of the body so that the retriever may be attached to a fishing line having tackle thereon with the fishing line extending through the spring members and through the longitudinally extending bore in the body, whereby the retriever may slide, by gravity, down the fishing line to the obstruction on which the tackle is caught or to the portion of the tackle that is snagged so that the weight of the body of the retriever will cause the spring on one end of the body to bounce against the obstruction or the tackle and to jar the tackle and free it from the obstruction.

It is another object of this invention to provide a retriever of the type described having means thereon for attaching a free line thereto to be held by the fisherman so the fisherman may pull the retriever up along the fishing line and allow it to fall by gravity to impart additional jarring forces to the tackle and fishing line where it is caught on the obstruction.

It is still another object of this invention to provide a retriever of the type described having a longitudinally extending slot therein and having a line storage rack adapted to be disposed in this longitudinal slot so the retrieving line attached to the retriever may be wound around this rack for storage purposes when the retriever is not in use. The rack must be removed from the longitudinally extending slot when it is desired to use the retriever and the rack may be used as a handle for holding the retrieving line. The fishing line is then inserted through the slot and spirally threaded through the springs on the ends of the retriever.

Some of the objects of the invention having been stated, other objects will appear as the description proceeds, when taken in connection with the accompanying drawings, in which—

Figure 1 is an elevation of the retriever showing it in a position it may assume on a fishing line adjacent the tackle or the obstruction on which the tackle is entangled;

Figure 1A is an extension of the left-hand side of Figure 1 showing the line storage rack which is adapted to be fitted into the body of the retriever and around which the retrieving line may be wound;

Figure 2 is a top plan view of the retriever showing the manner in which a fishing line is inserted therein but omitting the retriever line;

Figure 3 is a side elevation of the retriever disassociated from the fishing line and showing the retriever line storage rack with the retriever line wound therearound;

Figure 4 is a vertical sectional view taken substantially along the line 4—4 in Figure 3;

Figure 5 is a top plan view of the retriever showing the storage rack for the retrieving line in position but omitting the retrieving line for purposes of clarity;

Figure 6 is a vertical sectional view taken substantially along the line 6—6 in Figure 1.

Referring more specifically to the drawings the numeral 10 indicates a fishing line emanating from a fishing pole or a rod and reel, not shown, and which has any suitable kind of tackle or lure attached to the free end thereof, and; in the present instance, this tackle is shown as merely comprising a hook 11 and one or more weights 12 are usually attached to the fishing line 10 adjacent the hook 11.

Now, it is well known that in fishing it very often happens that after a cast has been made into a lake, river, ocean or the like, the hook or tackle at the end of the fishing line may become entangled on some obstruction floating on the water or extending through the water or it may become entangled on some obstruction submerged in the water, as indicated at 13 in Figure 1. Thus, when the fisherman desires to wind in his line he will be unable to do so. Further, if the fisherman desires to inspect the bait or lure on his line and begins to wind in his line, the winding-in process may cause the hook or the like on the end thereof to become snagged by an obstruction such as 13.

If the obstruction offers a greater resistance to being moved than can be safely overcome by the strength of the fishing line, it will usually result in the fishing line 10 being broken somewhere between the rod and the reel and the tackle thus resulting in the loss not only of the tackle but also of a major portion of the fishing line.

The present invention relates to a retriever for retrieving the tackle along with the line when it has become snagged thus preventing the line from being broken. This retriever comprises a body member 15 which is preferably circular in cross-section and has sloped outer surfaces 16 and 17 to facilitate its movement through the water. The body member has a longitudinally extending bore 18 therein and a longitudinally and radially extending slot 20 therein communicating with the bore 18. The end of the body 15 nearest the fisherman, or the left-hand end thereof in Figures 1 and 2, has secured thereto, by any suitable means such as welding, a coiled spring guide 22 having an inner diameter substantially the same as the diameter of the bore 18 in the body 15. The other end of the body 15 has a coiled spring 23 preferably of greater length than the coiled spring 22 secured thereto by any suitable means such as welding. The coiled spring 23 also has an inner diameter substantially the same as the diameter of the bore 18 in the body 15. The endmost coils at the proximate ends of the coiled springs 22 and 23 must terminate in such a manner as to permit ingress and egress of the fishing line 10 relative to the slot 20 and so the line 10 may be directed, spirally, into the confines of the coiled springs 22 and 23 as shown in Figures 1 and 2.

A flat spool or line storage rack 25 of leaf spring material is provided for storing a retrieving line 26 when the retriever is not in use and for holding one end of the retrieving line when the retriever is being used. The rack 25 is substantially planar but is bowed slightly, as at 25a, as will be observed in Figure 5, and each end has a concave surface 27 for holding the retrieving line 26 thereon. The rack 25 has a bore 28 therein through which the retrieving line 26 is passed and is knotted to secure the retrieving line to the rack 25. The body 15 has a hole 30 therein to which the end of the retrieving line 26 remote from the rack 25 is connected as shown in Figures 1 and 3.

The line storage rack adapted to be removably secured within the slot 20 in the body 15 of the retriever and to hold the retrieving line 26 thereon when the retriever is not in use as is clearly shown in Figures 4, 5 and 6. The distance from the center of a straight line drawn between opposed ends of the rack 25 and the remote convex surface thereof is normally greater than the slot 20 so the rack may be partially straightened upon being inserted in the slot 20 and its inherent tension will cause it to return to its curved state and frictionally engage the walls of the slot 20.

Now, when it is desired to use the retriever, the line storage rack 25 is removed from the slot 20 and a portion of the retrieving line 26 is unwound therefrom. The retriever is then placed on the fishing line 10 by placing the fishing line 10 in the longitudinally extending slot 20 and then winding one end of the fishing line 10 spirally through the spring 22 and the other end of the fishing line spirally through the spring 23, as is shown in Figure 2, so the fishing line will be disposed within the springs 22 and 23 and will extend through the longitudinally extending bore 18 in the body 15 of the retriever substantially as shown in Figure 1. The retrieving line 26 on the rack 25 is then unwound as far as is necessary to allow the retriever to slide, by gravity, along the fishing line 10 to a point where the free end of the spring 23 will strike the hook 11 or other tackle on the end of the fishing line 10 and the weight of the body 15, since it, preferably made of a heavy metal, will cause the spring 23 to jar the tackle and free it from the obstruction 13.

If the hook or tackle 11 is snagged on an obstruction in such a manner as to prevent the free end of the spring 23 from engaging the hook or tackle 11, the spring will strike the obstruction and the weight of the body 15 will cause the spring 23 to compress as it strikes the obstruction and the spring will then expand to impart a jarring force to the obstruction to shake the hook or tackle 11 free from the obstruction. In the event the retriever does not free the tackle from the obstruction the first time it is used, the operator may pull on the retrieving line 26 to pull the retriever toward the operator a substantial distance. The operator may then release the retriever, letting it fall freely, by gravity, along the fishing line 10 so it will again strike the tackle or the obstruction to thus jar the tackle free from the obstruction.

Although the apparatus is shown in the drawings as being on a fishing line of a relatively slight incline it is evident that this apparatus will work equally as well or better if the line is suspended in a substantially vertical attitude. All that is necessary is that the incline of the line be sufficient for the retriever to move down the same by gravity. It is thus seen that this retriever can be used with equal efficiency for deep water fishing or for fly casting and by virtue of its spring jarring action it will enable a fisherman to free his tackle from obstructions and to prevent the loss of his tackle or a portion of his fishing line.

In the drawings and specification there has been set forth a preferred embodiment of the invention, and although specific terms are employed, they are used in a generic and descriptive sense only, and not for purposes of limitations, the scope of the invention being defined in the claim.

I claim:

A fishing tackle retriever for retrieving tackle on a fishing line that has become hung on an obstruction comprising an elongated metallic body provided with flat ends and having a longitudinally extending bore therein extending the length of the body member and having a longitudinally and radially extending slot communicating with said bore and the exterior of the body, a pair of coiled compression springs having one of their ends secured to each of the flat ends of the body and having their interior diameters coinciding with the longitudinal axis of the longitudinally extending bore, the spring on the leading end of the body being much longer than the spring on the trailing end of the body and being a compression spring, a retrieving line secured to the body, a substantially spring steel planar member normally bowed out of a straight line and adapted to fit in the longitudinally extending slot and adapted to have the retrieving line wound therearound, said retrieving line also being secured to the substantially planar member, whereby the substantially planar member may be removed from the longitudinally extending slot and the retriever may be placed on a fishing line with the fishing line extending through the longitudinally extending bore and the coiled springs so that the retriever may be lowered on the fishing line by the retrieving line to where the spring on the leading end of the body will engage the tackle or the obstruction several successive times due to the momentum of the body to free the tackle from the obstruction.

VELES P. BIVENS.

REFERENCES CITED

The following references are of record in the file of this patent:

UNITED STATES PATENTS

| Number | Name | Date |
|---|---|---|
| 1,655,065 | LeBaron | Jan. 3, 1928 |
| 1,885,311 | Whitcomb | Nov. 1, 1932 |
| 2,143,942 | Gruenhagen | Jan. 17, 1939 |
| 2,316,500 | Bray | Apr. 13, 1943 |
| 2,344,838 | Van Sickle | Mar. 21, 1944 |
| 2,385,415 | Jackson | Sept. 25, 1945 |
| 2,472,207 | Gundel | June 7, 1949 |